(12) United States Patent
Takizawa

(10) Patent No.: US 8,018,125 B2
(45) Date of Patent: Sep. 13, 2011

(54) LINEAR DRIVE ULTRASONIC MOTOR

(75) Inventor: Hiroyuki Takizawa, Chofu (JP)

(73) Assignee: Olympus Corporation, Tokyo (JP)

( * ) Notice: Subject to any disclaimer, the term of this patent is extended or adjusted under 35 U.S.C. 154(b) by 235 days.

(21) Appl. No.: 12/427,260

(22) Filed: Apr. 21, 2009

(65) Prior Publication Data

US 2009/0267454 A1 Oct. 29, 2009

(30) Foreign Application Priority Data

Apr. 24, 2008 (JP) ................... 2008-114266

(51) Int. Cl.
*H02N 2/08* (2006.01)

(52) U.S. Cl. ......... 310/323.17; 310/323.02; 310/323.05; 310/323.14; 310/323.16; 310/328

(58) Field of Classification Search ............. 310/323.16, 310/323.17, 323.02, 323.05, 323.14, 328
See application file for complete search history.

(56) References Cited

U.S. PATENT DOCUMENTS

| 6,218,767 B1 * | 4/2001 | Akada et al. ............. 310/323.02 |
| 7,129,620 B2 * | 10/2006 | Sakano et al. ............ 310/323.09 |
| 7,199,506 B2 * | 4/2007 | Sasaki et al. .................. 310/328 |
| 7,449,802 B2 * | 11/2008 | Sasaki et al. ............. 310/323.02 |
| 2004/0095040 A1 * | 5/2004 | Magnussen et al. ...... 310/323.16 |
| 2006/0043824 A1 * | 3/2006 | Sakano et al. ........... 310/323.09 |

FOREIGN PATENT DOCUMENTS

JP 3524248 2/2004

* cited by examiner

*Primary Examiner* — Walter Benson
*Assistant Examiner* — Bryan Gordon
(74) *Attorney, Agent, or Firm* — Scott, Scott, Murphy & Presser, P.C.

(57) ABSTRACT

A linear drive ultrasonic motor includes at least an ultrasonic vibrator having a piezoelectric element, a driven member which is driven by a frictional force between the driven member and the ultrasonic vibrator, a pressing member which presses the ultrasonic vibrator such that a frictional force is generated between the ultrasonic vibrator and the driven member, a guiding mechanism which movably supports the driven member, and a case member which accommodates the ultrasonic vibrator, the pressing member, and the guiding means. The case member includes a first opening portion for making the driven member pass through, and a second opening portion which opens in a direction different from a direction in which the first opening portion opens and a direction of pressing by the pressing member.

1 Claim, 3 Drawing Sheets

LINEAR DRIVE ULTRASONIC MOTOR

CROSS-REFERENCE TO RELATED APPLICATION

The present application is based upon and claims the benefit of priority from the prior Japanese Patent Application No. 2008-114266 filed on Apr. 24, 2008; the entire contents of which are incorporated herein by reference.

BACKGROUND OF THE INVENTION

1. Field of the Invention

The present invention relates to a linear drive ultrasonic motor.

2. Description of the Related Art

A vibration apparatus in Japanese Patent No. 3524248 Specification (FIGS. 3A and 3B) can be cited as an example of a conventional linear drive ultrasonic motor. Here, FIG. 3A and FIG. 3B are diagrams showing a structure of the conventional linear drive ultrasonic motor, where FIG. 3A is an exploded perspective view and FIG. 3B is a vertical cross-sectional view.

The vibration apparatus shown in FIG. 3A and FIG. 3B includes a case 906 which accommodates a vibrating body 901, a mobile object 904 which passes through the case 906 and makes a contact with the vibrating body 901, and a pressing spring 905 which generates pressing force (a bias) which brings the mobile object 904 and the vibrating body 901 in a pressurized contact. The pressing spring 905 is installed at an outer side of the case 906. An opening portion is formed in a side of the case 906, facing the vibrating body 901, and the pressing force of the pressing spring 905 acts on the vibrating body 901 through the opening portion. In other words, this vibration apparatus has a structure in which the pressing spring 905 is installed on the outer side of the case 906 while covering the opening portion of the case 906, and a deformed portion (a plane surface portion covering the opening portion) of the pressing spring 905 which generates the pressing force is exposed.

However, in the vibration apparatus described in Japanese Patent No. 3524248 Specification, when installed on some external apparatus, for avoiding a change in the pressing force of the pressing spring 905, there is a limitation of designing that the pressing spring 905 does not make a contact with a member of the external apparatus, in other words, that an arrangement is to be made to avoid the pressing spring 905.

SUMMARY OF THE INVENTION

The present invention is made in view of the abovementioned circumstances, and an object of the present invention is to provide a small-size linear drive ultrasonic motor which is capable of achieving a stable pressing force, and which has fewer restrictions regarding a relationship with an external apparatus.

To solve the abovementioned issues and to achieve the object, according to the present invention, there is provided a linear drive ultrasonic motor including at least an ultrasonic vibrator having a piezoelectric element, a driven member which is driven by a frictional force between the driven member and the ultrasonic vibrator, a pressing member which presses the ultrasonic vibrator such that a frictional force is generated between the ultrasonic vibrator and the driven member, a guiding mechanism which movably supports the driven member, and a case member which accommodates the ultrasonic vibrator, and the pressing member and the guiding means, and the case member includes a first opening portion for making the driven member pass through, and a second opening portion which opens in a direction different from a direction in which the first opening portion opens and a direction of pressing by the pressing member.

In the linear drive ultrasonic motor according to the present invention, it is preferable that the case member is made of one member.

In the linear drive ultrasonic motor according to the present invention, it is preferable that the second opening portion has a size which allows the ultrasonic vibrator to pass through.

BRIEF DESCRIPTION OF THE DRAWINGS

FIG. 3A is an exploded perspective view, and FIG. 3B is a vertical cross-sectional view.

DETAILED DESCRIPTION OF THE PREFERRED EMBODIMENTS

In the following, embodiments of the linear drive ultrasonic motor according to the present invention will be described in detail with reference to the accompanying drawings. It should be understood that the present invention is not limited by the embodiments.

An ultrasonic motor 10 (linear drive ultrasonic motor) according to the embodiment of the present invention will be described below while referring to FIG. 1 and FIG. 2. However, the present invention is not restricted by the embodiment described below. Here, FIG. 1 is an exploded perspective view showing a structure of the ultrasonic motor 10, and FIG. 2 is a perspective view showing an outward appearance of the ultrasonic motor 10 in an assembled state.

Figure 1:
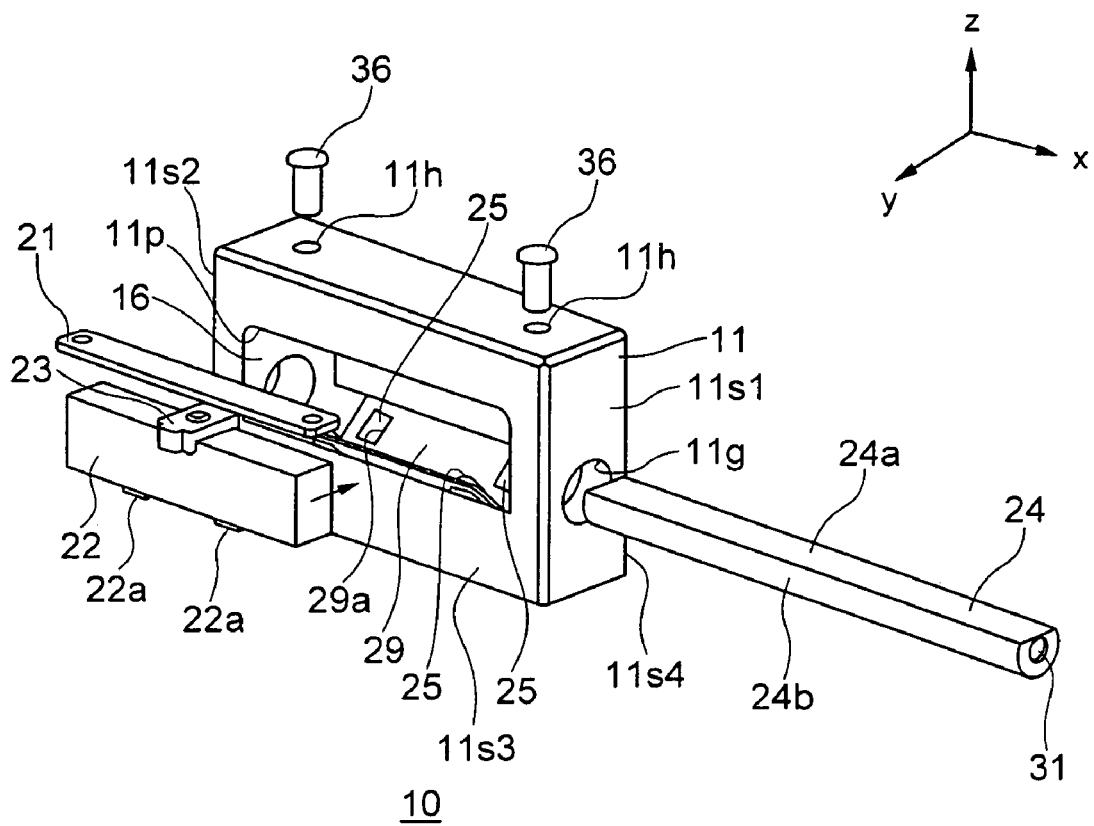
FIG. 1 is an exploded perspective view showing a structure of an ultrasonic motor according to an embodiment of the present invention.
Figure 2:
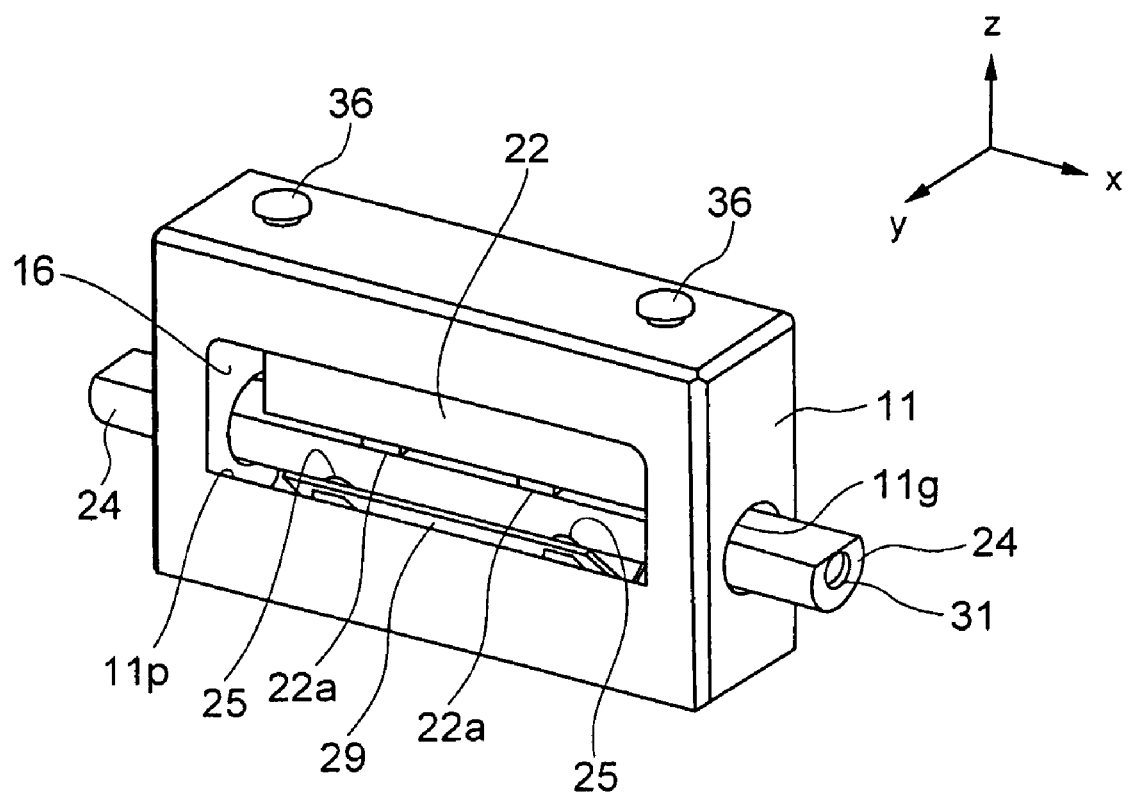
FIG. 2 is a perspective view showing an outward appearance of an ultrasonic motor in an assembled state.
Figure 3B:
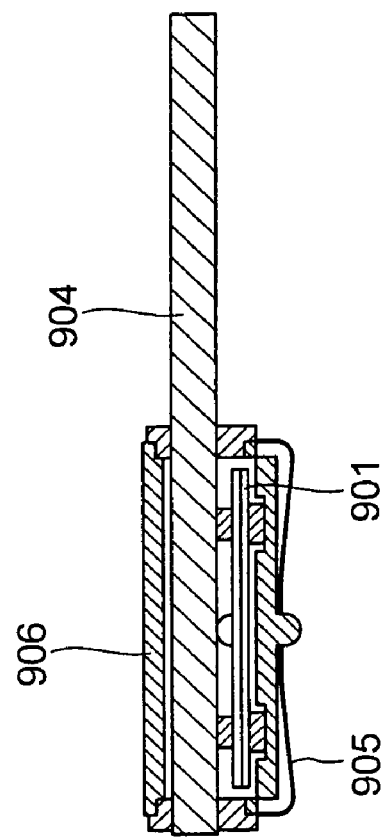
FIG. 3A and FIG. 3B are diagrams showing a structure of a conventional linear drive ultrasonic motor where.
Figure 3A:
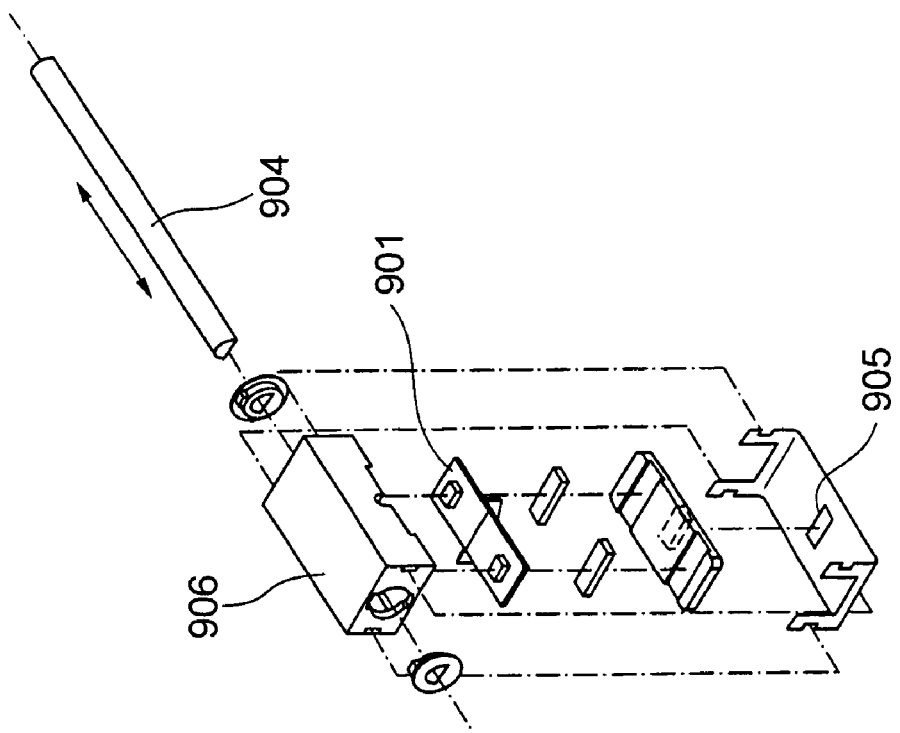

As shown in FIG. 1, the ultrasonic motor 10 includes a vibrator 22 as an ultrasonic vibrator, a driven member 24, a pressing member 21, a case member 11, and rolling members 25 as a guiding mechanism. Each member will be described below in detail.

Both the vibrator 22 and the case member 11 have a substantially rectangular parallelepiped outer shape, and an accommodating recess 16 is formed at an interior of the case member 11. The pressing member 21, the vibrator 22, a guiding member 29, and the rolling members 25 are accommodated in the accommodating recess 16, in this order from an upper side, in a direction of height (z direction in FIG. 1) of the ultrasonic motor 10.

The pressing member 21 is a plate spring in the form of a long plate, and is disposed such that a longitudinal direction thereof is along a longitudinal direction (x direction in FIG. 1(a)) of the ultrasonic motor 10 and the case member 11. The rolling members 25 are disposed such that two rolling members 25 each are in two rows along the longitudinal direction of the case member 11.

The guiding member 29 has a shape formed by bending the long plate shaped member with a direction of width as a center. A guide hole 29a which is a through hole is provided at a position corresponding to the rolling member 25 when the guiding member 29 is accommodated inside the accommodating recess 16 of the case member 11 such that a bending portion is disposed at a lower side. It is preferable that a position of the guiding member 29 is fixed by being engaged with an engaging portion (not shown in the diagram) provided inside the accommodating recess 16. According to this structure, inside the accommodating recess 16, the four rolling members 25 being pierced from a lower side up to an upper side of the guide hole 29a of the guiding member 29, the four rolling members 25 are positioned in a state of being capable of rolling.

The driven member 24 is a member in a form of a shaft having a cross-sectional shape of an English alphabet D. A flat surface portion 24a of the driven member 24 makes a contact with the vibrator 22 via a drive element 22a, and a curved surface portion 24b of the driven member 24 is in contact with the rolling member 25.

A first opening portion 11g is formed in the accommodating recess 16, along a direction (x direction) in which the driven member 24 is driven. The driven member 24 is extended toward an outer side of the case member 11 upon passing through the first opening portion 11g.

On the other hand, inside the accommodating recess 16 of the case member 11, the driven member 24 is in contact with and supported by the rolling member 25 which has protruded at an upper side of the guide hole 29a of the guiding member 29. The driven member 24 is capable of moving in the longitudinal direction, by being supported by the rolling member 25 which is disposed along the longitudinal direction of the case member 11.

An upper surface at both-end portions in the longitudinal direction of the pressing member 21 can be pressed by pressing screws 36 (pressurizing members). A front tip of the pressing screw 36 is extended up to an inside of the accommodating recess 16, through a screw hole 11h which is a through hole provided in an upper surface of the case member 11. Moreover, the pressing member 21 is disposed such that a lower surface of a central portion in the longitudinal direction thereof makes a contact with a supporting member 23 for positioning of the vibrator 22. Here, the supporting member 23 is fixed at a center in the longitudinal direction (x direction in FIG. 1(a)) of the vibrator 22. Moreover, the vibrator 22 is formed of an ultrasonic vibrator (such as a piezoelectric element). A driving method of the ultrasonic vibrator being hitherto known, in the following diagram, an electrical wiring for driving the vibrator 22 is omitted. Moreover, an engaging groove (not shown in the diagram) in which a projected portion (a projection) of the supporting member 23 is engaged is formed inside the accommodating recess 16 of the case member 11.

Moreover, a second opening portion 11p is formed in the case member 11, in a direction (y direction) orthogonal to both a direction of pressing (z direction) by the pressing member 21 and a direction in which the first opening portion 11g opens. In other words, the second opening portion 11p is formed in each of two side surfaces 11s3 and 11s4 orthogonal to two side surfaces 11s1 and 11s2 in which the first opening portion 11g is provided, out of side surfaces of the case member 11. The second opening portion 11p may not be in the direction orthogonal to both the direction of pressing by the pressing member 21 and the direction in which the first opening portion 11g opens, and may be in a different direction or a direction intersecting.

It is preferable that the second opening portion 11p has a size and shape which allows at least the vibrator 22 to pass through, and it is more preferable that the second opening portion 11p has a size and shape which allows a unit which has supported the pressing member 21 on the supporting member 23 fixed to the vibrator 22, to pass through. Moreover, the second opening portions 11p formed in the two side surfaces 11s3 and 11s4 may have a same size and shape, or may have a different size and shape. When the second opening portions 11p are formed to have different sizes and shapes, it is preferable that the size and the shape of at least one second opening portion 11p allows at least the vibrator 22 to pass through.

Moreover, as shown in FIG. 1 and FIG. 2, a coupling portion 31 for coupling with an external apparatus (not shown in the diagram) is provided at both end portions of the driven member 24, and it is possible to realize a linear mobile apparatus.

Assembling of the ultrasonic motor 10 having the above-mentioned structure is carried out as follows.

First of all, the pressing portion 21 is put into the accommodating recess 16 of the case member 11 from (through) the second opening portion 11p. Next, the vibrator 22 is fixed to the case member 11 by fitting the projected portion of the supporting member 23 and the engaging portion of the case member 11. Since the projected portion of the supporting member 23 and the engaging portion of the case member 11 are fitted, it is possible to handle integrally in this state.

Next, the driven member 24 is inserted through the first opening portion 11g. The driven member 24 inserted is supported by the rolling member 25. Furthermore, a pressing force by the pressing member 21 is set to a desired value by adjusting an amount of the pressing screw 36 extended into the accommodating recess 16. After setting the pressing force, it is possible to fix the pressing screw 36 by adhering to the screw hole 11h of the case member 11. The adjustment of the pressing force can be carried out by changing a material and a shape of the pressing member 21.

The case member 11 has a sufficiently high stiffness than a stiffness of the pressing member 21, and even when the case member 11 makes a contact with a member of an external unit which is not shown in the diagram, there is no change in an amount of bending of the pressing member 21. Therefore, a degree of freedom of designing of an external apparatus is improved. Moreover, since the pressing member 21 is not exposed to an outside of the case member 11, it is possible to use for positioning of installing by putting an outer shape of the case member 11 on the external apparatus. Furthermore, it is also possible to install directly on the external apparatus by providing an installation hole in the case member 11.

When a driven member is movable, as a guiding mechanism it is possible to use a structure in which a hemispherical member which does not roll is provided, or in the second case member, a portion in contact with the driven member is provided with a hemispherical projection, or a contact portion is let to be a smooth surface.

In the structures described above, since a frictional force is generated between the vibrator 22 and the driven member 24 by the pressing member 21 pressing the vibrator 22 with respect to the driven member 24, due to the vibrations of the vibrator 22, the driven member 24 moves in the longitudinal direction thereof. Furthermore, the driven member 24 being moved while being supported by the rolling member 25, it is possible to achieve a stable pressing force.

Moreover, since an inner portion of the case member 11 is clearly visible through the second opening portion 11p, it is possible to make easy a job at the time of assembling and maintenance, and to check easily an operating condition. Furthermore, since the structure is such that not only the vibrator 22 and the pressing member 21 but also the rolling member 25 is accumulated in one member, a relative positioning accuracy of these member is improved, which leads to an improvement in a motor performance and a reliability. Moreover, by making the second opening portion 11p of sufficient size, it is possible to discharge worn-out particles generated by drive, outside the case member 11, and to maintain the motor performance over a long period of time.

Since it is possible to fix the case member 11 on the external apparatus, it is applicable to a wide range of linear mobile apparatuses while achieving stably the pressing force by the pressing member 21.

Generally, in an ultrasonic motor apparatus, to form a unit structure in which main components are enclosed in a package is effective from points of versatility and stabilization of characters, and making a size small has been sought. Whereas, in a conventional ultrasonic motor, by making a size small in a state of the pressing member (bias applying member) encapsulated in the case member, an unevenness in pressing force is susceptible to become substantial, thereby making it difficult. However, a function of protecting the contents as a case with the pressing member in a state of being installed and exposed in the case is insufficient.

Whereas, in the ultrasonic motor according to the embodiment described above, it is possible to realize a unit structure in which it is possible to carry out positioning of the pressing member 21 easily, and the assembling and maintenance are also simple. In other words, the vibrator 22 is guided and accommodated toward an opening portion of the case member 11 in the form of a box, and the pressing member 21 is guided and accommodated toward a side opposite to the opening portion of the case member 11. Accordingly, it is possible to make the size small, as well as it is possible to fix the case member 11 to the external apparatus, and using for positioning, for the case member 11 which is a stiff body to protect by covering each member including the pressing member 21.

Furthermore, since the vibrator 22 makes a contact with the driven member 24 by the pressing force of the pressing member 21, in an enclosed space called the case member 11 made of one member, it is possible to prevent a generation of an abnormal noise. Moreover, by regulating one or both of the pressing member 21 and the vibrator 22, it is possible to suppress a generation of a resonance which is unnecessary for a precision driving of the driven object 24. Furthermore, by the structure in which, the vibrator 22 is disposed between the pressing member 21 and the driven member 24, a movement of the driven member 24 becomes smooth.

As it has been described above, the linear drive ultrasonic motor according to the present invention is suitable for a highly precise driving of a small-size equipment.

The linear drive ultrasonic motor according to the present invention shows an effect that it is possible to achieve a stable pressing force, and there are fewer restrictions regarding a relationship with an external apparatus, and it is possible to make a size small.

What is claimed is:

1. A linear drive ultrasonic motor comprising at least:
   an ultrasonic vibrator having a piezoelectric element;
   a driven member which is driven by a frictional force between the driven member and the ultrasonic vibrator;
   a pressing member which presses the ultrasonic vibrator such that a frictional force is generated between the ultrasonic vibrator and the driven member;
   a guiding mechanism which movably supports the driven member, the guiding mechanism comprising a guiding member having one or more rolling members for slidingly supporting the driven member; and
   a case member which accommodates the ultrasonic vibrator, the pressing member, and the guiding mechanism, wherein
   the case member includes a first opening portion for making the driven member pass through, and a second opening portion which opens in a direction different from a direction in which the first opening portion opens and a direction of pressing by the pressing member,
   the case member is made of one member, and
   the second opening portion has a size which allows the ultrasonic vibrator to pass through.

* * * * *